United States Patent
Kyle

(10) Patent No.: US 7,396,548 B2
(45) Date of Patent: Jul. 8, 2008

(54) MICROALGAL FEEDS CONTAINING ARACHIDONIC ACID AND THEIR PRODUCTION AND USE

(75) Inventor: David J. Kyle, Columbia, MD (US)

(73) Assignee: Advanced BioNutrition Corporation, Columbia, MD (US)

( * ) Notice: Subject to any disclaimer, the term of this patent is extended or adjusted under 35 U.S.C. 154(b) by 31 days.

(21) Appl. No.: 10/508,156

(22) PCT Filed: Mar. 19, 2003

(86) PCT No.: PCT/US03/07278

§ 371 (c)(1), (2), (4) Date: Aug. 10, 2006

(87) PCT Pub. No.: WO03/079810

PCT Pub. Date: Oct. 2, 2003

(65) Prior Publication Data

US 2006/0024404 A1    Feb. 2, 2006

Related U.S. Application Data

(60) Provisional application No. 60/365,182, filed on Mar. 19, 2002.

(51) Int. Cl.
  *A23K 1/18* (2006.01)
  *A23K 1/17* (2006.01)
(52) U.S. Cl. ............................. 426/2; 426/805; 424/442
(58) Field of Classification Search ............. 426/2, 426/805; 424/442
  See application file for complete search history.

(56) References Cited

U.S. PATENT DOCUMENTS 5,374,657 A * 12/1994 Kyle ................. 514/547

FOREIGN PATENT DOCUMENTS

| CA | 2200232 | | 9/1998 |
|---|---|---|---|
| JP | 275450 | | 10/1995 |
| JP | 9-98772 | | 4/1997 |
| JP | 10069275 | | 9/1999 |
| JP | 11243942 | * | 9/1999 |
| WO | WO 9737032 A2 | * | 10/1997 |
| WO | WO 9965327 A1 | * | 12/1999 |
| WO | WO 02/072742 A1 | | 9/2002 |

OTHER PUBLICATIONS

Ginzberg, A. et al., Chickens fed with biomass of the red microalga *Porphyridium* sp. have reduced blood cholesterol level and modified fatty acid composition in egg yolk, *J. Applied Phycology* 12:325-330 (2000), especially p. 327, col. 2, table 2.

Rebolloso Fuentes, M. M. et al., Biomass nutrient profiles of the microalga *Porphyrium cruentum*, Food Chem. 70:345-353 (2000), especially p. 345 col. 2, paragraph 2, p. 346 col. 1, paragraph 1, p. 348 col. 2, paragraph 1, p. 349 col. 1, table 5.

Hayashi, M. et al., Effects of shifting pH in the stationary phase of growth on the chemical composition of *Euglena gracilis*, Biosci. Biotech. Biochem. 58:1964-1967 (1994), especially p. 1964, col. 1, paragraph 1, p. 1965, col. 2, last paragraph, p. 1966, col. 1, table, and p. 1966, col. 2, paragraph 2.

* cited by examiner

*Primary Examiner*—C. Sayala
(74) *Attorney, Agent, or Firm*—Marianne Fuierer; Moore & Van Allen PLLC

(57) ABSTRACT

An animal feed with a high level of arachidonic acid is produced from microalgae, and fed to aquatic animals grown in aquaculture. The arachidonic acid-rich microalgae are fed directly to the aquatic animals, or processed to produce an oil that can be used as a human nutritive supplement. The arachidonic acid-rich microalgae can be combined with long chain omega-3 fatty acids to provide a source of nutrition for humans and animals. The animal feed and nutritional supplements are free of animal byproducts.

28 Claims, No Drawings

MICROALGAL FEEDS CONTAINING ARACHIDONIC ACID AND THEIR PRODUCTION AND USE

CROSS REFERENCE TO RELATED APPLICATIONS

This application is a U.S. national phase application based on PCT/US03/07278, filed Mar. 19, 2003, and claims the benefit of U.S. Provisional Application No. 60/365,182, filed Mar. 19, 2002, the content of both of which is incorporated herein by reference.

BACKGROUND OF THE INVENTION

1. Field of the Invention

This invention is directed to the production and use of certain arachidonic acid (ARA) rich microalgae for or in animal feeds and human foods. Such sources of arachidonic acid may be important for the enrichment of feeds used in agriculture, as they are vegetarian in nature and a renewable resource. There is a particularly important application in the field of aquaculture, as this environment is particularly depleted in sources of long chain omega-6 fatty acids, such as ARA. The algae can be produced in conventional autotrophic productions schemes or adapted, or engineered, to growth under heterotrophic conditions. The algae can be used as a feed directly through pelleting or compounding with other conventional feed sources, or used indirectly as a particulate for the enrichment of zooplankton (e.g., *Artemia* and rotifers) or other form of bioencapsulation, which are then consumed by the fish, crustaceans or mollusks. The ARA-rich algal biomass can also be processed to produce a pure triglyceride containing the ARA and delivered to humans or animals directly as the crude or refined oil. Other lipids and byproducts removed during the processing of the algal oil as well as the oil-extracted biomass can also be used as a feed ingredient.

2. Description of Related Art

Many seed oils are highly enriched in the 18-carbon, di-unsaturated, omega-6 fatty acid, linoleic acid (LA), and some even contain the 18-carbon, tri-unsaturated omega-6 fatty acid, gamma linolenic acid (GLA). However, terrestrial plants in general do not produce significant quantities of the 20-carbon, tetra-unsaturated, arachidonic acid (ARA). ARA is generally considered a fatty acid of animal origin and is an integral component of the structure, physiology and general biochemistry of most animals. For example, ARA makes up at least 20% of the fatty acid structure of the lipids of the gray matter of the brain in mammals. Consequently, all herbivorous animals have the ability to convert the dietary LA into ARA through elongation and desaturation enzymes inherent in those species. During periods of an animal's life history, however, preformed dietary ARA may be required due to a particularly high requirement for the ARA. Such a situation occurs, for example, in human infants where there is a period of accelerated brain growth and a requirement for large quantities of this building block of brain tissue. In this case, preformed ARA is delivered from the mother across the placenta to the fetus in utero and through the breast milk when the infant is nursing. Thus, sources of ARA are being sought for the supplementation of infant nutrition products to provide the ARA needed by the growing infant in a form similar to what it would get naturally from its mother.

Although the terrestrial environment is dominated by plants that are rich in omega-6 fatty acids other than ARA, it is deficient in plants that produce large amounts of omega-3 fatty acids. Thus, terrestrial animals, herbivores in particular, tend to be omega-3 deficient. The marine environment, on the other hand, is dominated by plants (phytoplankton and seaweeds) that are rich in omega-3 fatty acids, but are generally deficient in plants that produce large amounts of omega-6 fatty acids. Thus, marine animals, herbivores in particular, can potentially be omega-6 deficient, and particularly ARA deficient. Heretofore, this fact has not been recognized.

The consequences of omega-3 deficiency in the terrestrial animal diet (particularly man) have been well studied and it is believed that the effects of many of our chronic illnesses may be relieved in part by increasing the omega-3 intake in our diet (ie., lowering the ratio of omega-6 to omega-3 fats in our diet). Hyperimmune responses, platelet aggregation, and vasoconstriction are all thought to be related to excessive amounts of omega-6 fats in our diet. In an omega-6 deficient diet, that was replete in omega-3 fatty acids, immunosuppression, increased bleeding times and vasodilatation can be problematic. Since such an omega-6 deficient situation exists in most marine diets, the supplementation of ARA to such a diet should improve health and resistance to disease. This, in fact, was shown to be the case when an ARA-enriched dietary supplement was added to the regular diet of the marine fish Sea bream. In this case, there was an unexpected improvement in resistance to stress and disease when the ARA-supplement was used in this omega-6 deficient situation. Several products have now been offered for sale as aquaculture products containing supplements of ARA. These include VEVODAR™ (DSM, The Netherlands) and AQUA-GROW™ AA (Martek Biosciences Corp, USA).

Both of the above mentioned products are produced using an ARA-rich oil from the cultured filamentous fungus *Mortierella alpina*. The fungus is grown according to procedures well established in the art and the ARA-rich oil is extracted and used for various purposes. In the case of VEVODAR™, the oil itself is used as a raw material for feed formulations. In the case of AQUAGROW™ AA, the oil is mixed in with a feed matrix and provided as a novel feed formulation. No other sources of ARA have been anticipated as being acceptable for feeds or feed applications to date.

A few microalgae are known to produce ARA, although this is highly unusual in the marine environment. Such microalgae include, but are not limited to, Euglenophytes (e.g. *Euglena*), Rhodophytes (e.g., *Porphyridium*), and Chlorophytes (e.g., *Parietochlods*). Certain macroalgae (seaweeds) are also known to produce ARA. Such algae, or extracts thereof, would provide a beneficial diet for marine animals as whole algae, broken algae, or extracted material.

Certain crustaceans (e.g., brine shrimp, *Artemia*) or other zooplankton (e.g., rotifers) are used as feeds for various aquaculture crops (e.g., fish or shrimp) as they represent live feed for important first larval stages. In many cases, the *Artemia* are "loaded" with certain microalgae, which are carried into the larval animal through the consumption of the *Artemia*. In this way, certain beneficial nutrients, including ARA, can be provided from the algae to the larvae through the feed.

SUMMARY OF THE INVENTION

It is an object of the present invention to provide to a composition of matter, which is a feed or feed component for animals (vertebrates or invertebrates), or food or food component for humans, comprising a lipid containing arachidonic acid produced from an algal source.

In one embodiment, this invention provides a feed or food comprising whole microalgae. The algae can be provided as a wet paste or a dry powder. Whole algal cells can also be processed into pellets by, for example, standard extrusion processes or tableted using conventional tableting technology.

In another embodiment of this invention, the ARA-containing microalgae can be combined with a source of long chain omega-3 fatty acids, such as docosahexaenoic acid (DHA) or EPA, to provide a balanced nutritive source of long chain fatty acids. Such DHA or EPA sources may be also from microalgae, from fish or fish byproducts, from marine invertebrates, invertebrate byproducts or from recombinant organisms (e.g., algae, plants and bacteria).

In another embodimentp of this invention, the microalgae can be broken in order to facilitate uptake and digestion of the ARA by the animals. Alternatively, the ARA-containing lipids can be extracted and used as a source of ARA alone or in combination with other sources of DHA.

In another embodiment, the ARA-containing feed is free of viruses and infectious proteins (prions) or nucleic acids. There is great concern over providing animal byproducts to animals as feeds because of the potential for contamination of the animals with certain viruses or infectious proteins (prions) that may be associated with animal byproducts. This invention provides a solution to this problem in that algae (microalgae or macroalgae) are not animal sources and are not carriers of animal viruses, infective proteins, or nucleic acids.

In another embodiment, the ARA-rich feed has enhanced stability. ARA is a highly unsaturated fatty acid and, as such, is very prone to oxidation. The ARA from a fungal sources (e.g. *Mortierella alpina*) and animal sources have an inherent oxidative stability problem because of this high degree of unsaturation. This oxidation problem is exasperated by the processing steps required in the preparation of a formulated feed of suitable stability. Polyunsaturated fatty acids, such as ARA from the microalgal sources, however, have a higher degree of stability than the fungal or animal sources, thereby overcoming the problem of oxidative instability.

In another embodiment, the feeds or compositions described above are fed to increase the health or nutritional status of animals or humans.

DETAILED DESCRIPTION OF THE EMBODIMENTS

This invention provides advantages in delivering a stable formulated feed that is of vegetable origin, acceptable to the animals, and contains the correct balance of omega-6 and omega-3 long chain polyunsaturated fatty acids. Such a feed has not previously been made or contemplated. Microalgae are already common elements in the aquatic food chain, so it also represents a natural product for aquatic animals.

Algal cultures including, but not limited to *Euglena gracilis, Porphyridium cruentum, Parietochloris incisa* and "snow algae" can be obtained from any of a number of publicly accessible culture collections, university, other public sector groups, or proprietary industrial collections. Different algae will produce ARA in various complex lipid forms in different proportions. For example, *Porphyridium cruentum* will produce ARA in the form of a phospholipid and glycolipid, while *Parietochloris incisa* will produce ARA primarily in the form of a triglyceride. The latter case will be preferable because oil-producing algae, such as *Parietochloris*, are also more neutrally buoyant in the water column; thereby providing this species with some unexpectedly beneficial properties as a neutral buoyancy aquaculture feed.

Edible materials (foods and feeds) can be any materials that are ingested and that will not cause harm to the body. One embodiment of this invention would be where the algae are genetically modified to produce excess quantities of ARA, or to produce ARA under heterotrophic growth conditions using a reduced carbon source, such as, but not limited to, glucose, acetate or glutamate. This genetic modification can be a directed event (ie., the insertion of a specific gene, such as for glucose transport), or it can be a random modification of the alga's own genome through classical mutagenesis (e.g., ultraviolet light or chemical treatments) then selection of the phenotype of choice.

EXAMPLES

The invention, as contemplated herein, is described in the following examples using one ARA-rich alga (*Parietochloris*) for illustration purposes, but it's the invention's utility is not limited to this single ARA-rich alga or to the examples provided.

Example 1

Feed Comprising ARA Microalgal Cell Paste.

The ARA-rich microalga *Parietochloris incisa* is grown in a fresh water culture medium containing inorganic salts, a nitrogen source such as, but not limited to, urea, nitrate, ammonium ions, phosphate, and potassium, at a neutral pH. When the culture reaches a biomass density of at least 5 g/L with an ARA content in excess of 10% by weight of the cells, the culture is harvested by centrifugation or other suitable process. The cell paste can be bioencapsulated, for example used directly as an enrichment feed for *Artemia* and rotifers, which are then provided as live feed to larval shrimp or fish. Culture volumes can vary from 1 Liter flasks in the laboratory, larger scale photobioreactors (e.g., tubular type), 100,000 L tanks, to large paddlewheel-driven algal raceways (several hectares). All procedures are generally the same except for the scale of the process.

Example 2

Feed Composition Comprising ARA Microalgal Cells.

The ARA-rich microalga *Parietochloris incisa* is grown in a fresh water culture medium as described in Example 1 in the laboratory, outdoor ponds, tanks or photobioreactors. The algae are harvested by centrifugation, flocculation, flotation, or any other suitable means of concentration. The algae are then dried by spray drying, freeze drying, drum drying, vacuum drying, or any other suitable method of drying, to produce a dry powder containing ARA at a level of at least 10% by weight. This dry powder is then blended with an alternative source of protein such as, but not limited to, soy meal, corn meal, fishmeal, casein, pea meal or yeast at a ratio of from one to ten parts algae to one to ten parts protein source. Other binders, such as alginates and flow agents such as diatomaceous earth, can also be added. This dried material can be used directly as a powdered feed containing from 1-20% ARA, or it can be moistened and extruded to make pellets using conventional extrusion technology. To aid in digestibility, the algae can be broken prior to drying using common procedures such as, but not limited to a ball mill, cavitation pressure, or mechanical shearing. Such a feed can be used for larval crustacean culture and fish culture as well as for animal or human feeds.

Example 3

Feeds Comprising a Blend of ARA-Rich Microalgal Cells and DHA-Rich Microalgal Cells.

The ARA-rich microalga *Parietochloris incisa* is grown in a fresh water culture medium as described in Example 1 in the laboratory, outdoor ponds, tanks or photobioreactors. The culture is harvested by centrifugation, flocculation, flotation, or any other suitable means of concentration and then dried by spray drying, freeze drying, drum drying, vacuum drying, or any other suitable method of drying, to produce a dry powder containing ARA at a level of at least 10% by weight. This dry powder is then blended with an algal powder prepared from a DHA-producing alga such as, but not limited to, *Crypthecodinium cohnii*. *C. cohnii* will have a DHA content of at least 10% by weight. The two algal biomasses are mixed in a ratio of from one to ten parts ARA-rich algae to one to ten parts DHA-rich algae to provide a DHA/ARA ratio from 1:10 to 10:1. Other binders, such as alginates and flow agents such as diatomaceous earth, can also be added. This material can be used directly as a powdered feed containing from 1-20% ARA or it can be moistened and extruded to make pellets using conventional extrusion technology. Such a feed can be used for larval crustacean or fish culture, animal or human feeds.

Example 4

Feeds Comprising a Blend of ARA-Rich Microalgal Cells and DHA-Containing Materials.

The ARA-rich microalga *Parietochloris incisa* is grown in a fresh water culture medium as described in Example 1 in the laboratory, outdoor ponds, tanks, or photobioreactors. The culture is harvested by centrifugation, flocculation, flotation, or any other suitable means of concentration then dried by spray drying, freeze drying, drum drying, vacuum drying, or any other suitable method of drying, to produce a dry powder containing ARA at a level of at least 10% by weight. This ARA-rich dry powder is then blended with any DHA-containing material such as, but not limited to, fishmeal, fish oil, squid oil, crustacean byproducts, brain meal, or organ meats. The ARA-rich algae and DHA-containing materials are mixed in a ratio to provide a DHA/ARA ratio from 1:10 to 10:1. Other binders, such as alginates, and flow agents, such as diatomaceous earth, can also be added. This material can be used directly as a powdered feed containing from 1-20% ARA, or it can be extruded to make pellets using conventional extrusion technology. Such a feed can be used for larval crustacean culture and fish culture, as well as for animal or human feeds.

Example 5

Feeds Comprising ARA Microalgal Lipids.

The ARA-rich microalgae *Parietochloris incisa* is grown in a fresh water culture medium as described in Example 1 in the laboratory or in outdoor ponds, tanks, or photobioreactors. The culture is harvested by centrifugation, flocculation, flotation, or any other suitable means of concentration and then dried by spray drying, freeze drying, drum drying, vacuum drying, or any other suitable method of drying, to produce a dry powder containing ARA at a level of at least 10% by weight. The algal lipid is then extracted using nonpolar solvents such as, but not limited to, hexane, alcohol (isopropanol, ethanol, etc.), supercritical carbon dioxide, or propane. This extract would be called "crude lipid" and will be at least 20% by weight ARA. The crude lipid is then processed by conventional refining, bleaching and deodorizing to produce an "edible oil" which will be at least 20% by weight ARA and is preferably about 30% by weight ARA, more preferably 40% by weight ARA and most preferably 50% by weight ARA or higher. Phospholipids, free fatty acids and other lipid fractions are removed from the crude lipid during this purification process and are referred to herein as "refining byproducts". Crude ARA lipid, refining byproducts and edible oil can be used in the preparation of animal feeds. The lipid material is blended with a source of protein, such as, but not limited to, soy meal, corn meal, fishmeal, casein, pea meal or yeast, at a ratio of from one to ten parts algal lipid to one to fifty parts protein source. Other binders, such as alginates, and flow agents, such as diatomaceous earth, can also be added. This material can be used directly as a powdered feed containing from 1-20% ARA, or it can be moistened and extruded to make pellets using conventional extrusion technology. To aid in digestibility, the algae can be broken prior to drying using common procedures such as, but not limited to a ball mill, cavitation pressure, or mechanical shearing. Such a feed can be used for larval crustacean culture or fish culture, as well as animal or human feeds.

Example 6

Feeds Comprising a Blend of ARA Microalgal Lipids and DHA-Containing Materials.

The ARA-rich microalga *Parietochoris incisa* is grown in a fresh water culture medium as described in Example 1 in the laboratory, outdoor ponds, tanks, or photobioreactors. The culture is harvested by centrifugation, flocculation, flotation, or any other suitable means of concentration then dried by spray drying, freeze drying, drum drying, vacuum drying, or any other suitable method of drying, to produce a dry powder containing ARA at a level of at least 10% by weight. The algal lipid is then extracted using nonpolar solvents such as, but not limited to, hexane, alcohol (isopropanol, ethanol, etc.), supercritical carbon dioxide, or propane. This extract would be called "crude lipid". The crude lipid is then processed by conventional refining, bleaching and deodorizing to produce an "edible oil". Phospholipids, free fatty acids and other lipid fractions are removed from the crude lipid during this purification process and are referred to herein as "refining byproducts". Crude ARA lipid, refining byproducts, and edible oil can be used in the preparation of animal feeds. These lipid products are formulated with DHA-containing materials such as, but not limited to, DHA algae or algal products, fishmeal, fish oil, squid oil, crustacean byproducts, brain meal, or organ meats. The algal ARA lipids and DHA materials are mixed in a ratio to provide a DHA/ARA ratio from 1:10 to 10:1. Other binders, such as alginates, and flow agents, such as diatomaceous earth, can also be added. This material can be used directly as a powdered feed containing from 1-20% ARA, or it can be extruded to make pellets using conventional extrusion technology. Such a feed can be used for larval crustacean or fish culture, animal or human feeds.

Example 7

Foods Comprising ARA-Rich Microalgae

The ARA-rich microalga *Parietochloris incisa* is grown in a fresh water culture medium as described in Example 1 in the laboratory, outdoor ponds, tanks or photobioreactors. The culture is harvested by centrifugation, flocculation, flotation, or any other suitable means of concentration and then dried by spray drying, freeze drying, drum drying, vacuum drying, or any other suitable method of drying, to produce a dry powder containing ARA at a level of at least 10% by weight. This dry product can be used directly as a human nutritive supplement as a powder, colloidal suspension, or tablet.

Example 8

Foods Comprising ARA Microalgal Lipids

The ARA-rich microalga *Parietochloris incisa* is grown in a fresh water culture medium as described in Example 1 in the laboratory or in outdoor ponds, tanks, or photobioreactors. The culture is harvested by centrifugation, flocculation, flotation, or any other suitable means of concentration and then dried by spray drying, freeze drying, drum drying, vacuum drying, or any other suitable method of drying, to produce a dry powder containing ARA at a level of at least 10% by weight. The algal lipid is then extracted using nonpolar solvents such as, but not limited to, hexane, alcohol (isopropanol, ethanol, etc.), supercritical carbon dioxide, or propane. This extract would be called "crude lipid". The crude lipid is then processed by conventional refining, bleaching and deodorizing to produce an "edible oil". This oil can then be added to conventional food matrices including, but not limited to, infant formulas, toddler formulas, adult formulas, bars, or cereals. The oil can also be packaged in individual dose units including, but not limited to, soft gelatin capsules, sachets, and foil pouches.

Example 9

Foods Comprising ARA Microalgae and DHA Materials

Foods as described in Example 7 combined with DHA rich materials as described previously to provide a DHA to ARA ratio from 1:10 to 50:1.

Example 10

Foods Comprising ARA Microalgal Lipids and DHA Materials

Foods as described in Example 8 combined with DHA-rich materials as described previously to provide a DHA to ARA ratio from 1:10 to 50:1.

What is claimed is:

1. A feed for an animal comprising one or more microalgae or portions thereof which comprise arachidonic acid, wherein the microalgal arachidonic acid comprises from about 1% to about 20% of the feed, and wherein the arachidonic acid is predominantly in a triglyceride form and wherein the microalgae is chosen from *Euglena, Parietochloris* or snow algae.

2. The feed of claim 1, wherein the animal is an aquatic animal.

3. The feed of claim 2, wherein the aquatic animal is aquacultured.

4. The feed of claim 2, wherein the aquatic animal is a zooplankter.

5. The feed of claim 2, wherein the aquatic animal is chosen from a fish, crustacean, or mollusk.

6. The feed of claim 4, wherein the zooplankter is chosen from a crustacean, brine shrimp, *Artemia*, or rotifer.

7. The feed of claim 1, wherein the feed further comprises docosahexaenoic acid.

8. The feed of claim 7 wherein the ratio of docosahexaenoic acid to arachidonic acid ranges from about 1:10 to 50:1.

9. The feed of claim 8, wherein the source of docosahexaenoic acid is a microalga other than *Euglena, Porphyridium*, or snow alga.

10. The feed of claim 8, wherein the source of docosahexaenoic acid is *Crypthecodinium cohnii*.

11. The feed of claim 8, wherein the source of docosahexaenoic acid is fish oil.

12. A method of delivering a feed comprising arachidonic acid to an animal comprising:
   (a) providing a feed that comprises from about 1% to about 20% arachidonic acid as the dry weight of the feed, wherein the arachidonic acid is predominantly in a triglyceride form; and
   (b) providing the feed to the animal, wherein the arachidonic acid is provided by a microalgae or parts thereof and wherein the microalgae is chosen from *Euglena, Parietochloris* or snow algae.

13. The method of claim 12, wherein the animal is an aquatic animal.

14. The method of claim 13, wherein the aquatic animal is aquacultured.

15. The method of claim 13, wherein the aquatic animal comprises one or more zooplankter.

16. The method of claim 15, wherein the zooplankter is chosen from one or more crustacean, brine shrimp, *Artemia*, or rotifer.

17. The method of claim 13, wherein the aquatic animal is a fish, crustacean, or mollusk.

18. The method of claim 12, wherein the feed further comprises docosahexaenoic acid.

19. The method of claim 18, wherein the ratio of docosahexaenoic acid to arachidonic acid ranges from about 1:10 to about 50:1.

20. The method of claim 19, wherein the source of docosahexaenoic acid is microalga other than *Euglena, Parietochioris*, or snow alga.

21. The method of claim 19, wherein the source of docosahexaenoic acid is *Crypthecodinium cohnii*.

22. The method of claim 19, wherein the source of docosahexaenoic acid is fish oil.

23. A human nutritive supplement comprising one or more miroalgae or portions thereof, which comprise arachidonic acid, wherein the microalgal arachidonic acid comprises at least about 10% by weight of the microalgae, and wherein the arachidonic acid is predominately in the form of a triglyceride and wherein the microalgae is chosen from *Euglena, Parietochloris* or snow algae.

24. The supplement of claim 23, wherein the supplement is in the form of a tablet, capsule, colloidal suspension, or powder.

25. The supplement of claim 23, wherein the supplement is added to a bar; liquid formula or cereal.

26. The supplement of claim 25, wherein the liquid formula is for an infant, toddler, or adult.

27. The supplement of claim 23, further comprising docosahexaenoic acid and wherein the source of the docosahexaenoic acid is a microalga other than *Euglena, Parietochloris* or snow alga.

28. The supplement of claim 27, wherein the source of docosahexaenoic acid is *Crypthecodinium cohnii*.

* * * * *